F. H. CRAGO.
TRAP.
APPLICATION FILED NOV. 5, 1919.

1,342,425.

Patented June 8, 1920.

Inventor
F.H. Crago.

Witness

By C.A.Snow & Co
Attorneys

UNITED STATES PATENT OFFICE.

FELIX H. CRAGO, OF HOT SPRINGS, MONTANA.

TRAP.

1,342,425.   Specification of Letters Patent.   Patented June 8, 1920.

Application filed November 5, 1919. Serial No. 335,839.

*To all whom it may concern:*

Be it known that I, FELIX H. CRAGO, a citizen of the United States, residing at Hot Springs, in the county of Sanders and State of Montana, have invented a new and useful Trap, of which the following is a specification.

This invention relates to new and useful improvements in traps, and more particularly to spring traps employed in catching animals.

The primary object of the invention is to provide a trap of this character which will be capable of catching relatively large animals, without the necessity of employing exceptionally large springs for the operation of the catching elements, which would break, or otherwise tend to injure the animal being caught.

A further object of the invention is to provide a device of this character which will transfer the strain usually directed to the springs of a trap of this character, to the securing means which secures the trap to the ground surface, in the event that an animal caught thereby endeavors to release himself.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
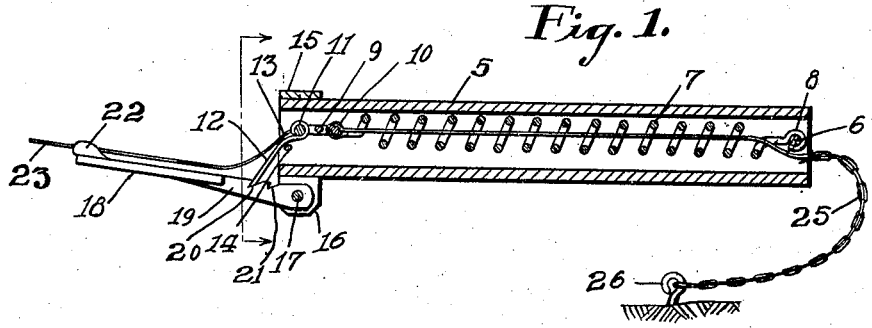
Figure 1 illustrates a longitudinal sectional view through a trap constructed in accordance with the present invention.
Figure 2:
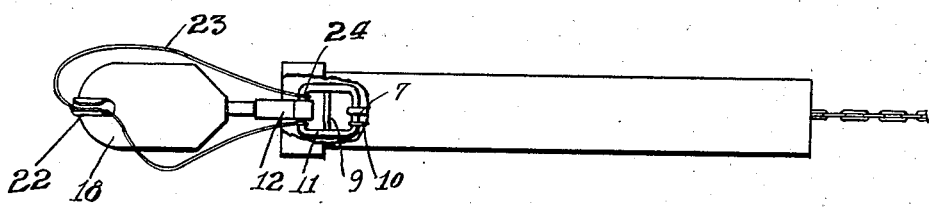
Fig. 2 illustrates a plan view of the same.
Figure 3:
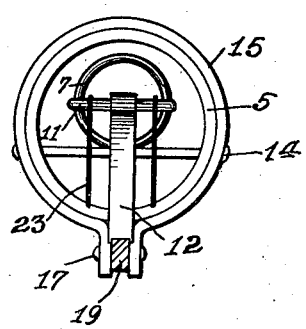
Fig. 3 illustrates a sectional view taken on line 3—3 of Fig. 1.

Referring to the drawing in detail, the reference character 5 designates the body of the trap which includes a relatively long tubular member, open at both ends in order that the securing device, and catching device may have connection with the interior of the body 5.

The stub arm 6, extends through one of the side walls of the tubular body 5, and provides means for anchoring one extremity of the coiled spring 7, to the body 5, the coiled spring having a looped portion 8, embracing the arm 6, the opposite extremity of the spring 7, being looped around the link 9, as at 10, the opposite bar 11 of the link 9 forming a support for one extremity of the keeper 12, which is curved as at 13, to engage over the pin 14, extending across the mouth of the tubular member 5, the same having connection with the side walls thereof.

Disposed at one end of the tubular body 6, and embracing one end thereof, is the collar 15, which collar has extensions 16, forming bearings for the pivot pin 17, which pin 17 has connection with the treadle 18, through the medium of the supporting arm 19, which as shown is provided with the cut out portions 20 and 21, which cut out portions are adapted to receive one extremity of the keeper 12, whereby the trap is set, the keeper 12 being moved to its set position, against the tension of the coiled spring 7, thus causing the keeper to frictionally engage the side walls of one of the cut out portions 20 or 21, in which the same may be positioned.

This treadle 18, is relatively wide, and is provided with the spring clip 22, disposed adjacent the outer or free end of the treadle, which spring clip is constructed to receive a portion of the catching member 23, which is in the form of a wire loop, the ends thereof having connection with the link 9, as at 24, so that movement of the link, within the tubular body 5, causes a relative movement of the catching member 23.

The trap, in operation, is staked or otherwise secured against displacement, the flexible element 25, providing means for securing the trap, and as shown, one end of this flexible element has connection with the link 9, adjacent the connection between the link and one end of the coiled spring 7, the flexible element passing directly through the coils of the spring 7, the opposite end of said flexible element 25, being shown as having connection with the stake 26, by means of which the trap is staked in a predetermined position, however it might be found well to secure the stake 26 to a tree or other permanent fixture.

From the foregoing it is obvious that when the trap is set, the treadle 18, is supported in a position as indicated by Fig. 1 of the drawing, in which position the treadle is disposed in spaced relation with the ground surface, so that an animal stepping thereon causes the treadle 18 to pivot downwardly, releasing the keeper 12, with the result that the coiled spring 7 contracts, or moves from its expanded position, thus drawing the catching element within the body 5 of the trap, reducing the diameter of said catching element 23, and drawing the portion of the animal caught by the catching element 23, into close engagement with one end of the tubular body 5.

It is now apparent that the strain, of the animal endeavoring to release himself from the catching element 23, will be directed to the flexible element 25, and to the securing stake 26, thus relieving the coiled spring 7 of the strain ordinarily directed thereto by the efforts of the animal.

In order to set the strap, it is necessary to slacken the flexible element 25, by moving the body of the trap toward the securing stake 26, whereupon the catching element 23, is drawn from the tubular body 5, until the keeper 12 extends beyond the forward end of the body 5, and in a position to be engaged by the treadle, or its supporting arm, to permit the keeper 12 to be properly positioned within one of the notches 20 or 21.

In the event that the trap is to be employed for catching relatively small animals, wherein the weight of the animal is insufficient to operate the keeper, when the same is positioned in the cut out portion 20, the keeper is of course set in the cut out portion 21, which will permit the trap to operate under less weight.

In operation the trap is preferably set in the path frequented by the animal to be caught, the same is hidden by underbrush, leaves or any suitable material, and the catching element 23, is positioned to substantially encircle the treadle 18, so that an animal stepping on the treadle 18, will be in a position to be caught by the catching element 23.

Having thus described the invention what I claim is:—

1. A trap including a tubular body portion, a coiled spring having one of its ends secured to the body portion adjacent one end thereof, a bar extending transversely across the tubular member adjacent the opposite end thereof, a treadle pivotally connected to the body, a keeper carried by the coiled spring, and engaging over the transversely extending bar for engaging the treadle to hold the same in spaced relation with the ground surface, means having connection with one end of the coiled spring for relieving the coiled spring of strain, directed thereto, after the trap is sprung, and a catching element operated by the coiled spring.

2. A trap including a tubular body portion, a coiled spring having one of its ends connected to the body portion, a treadle pivotally supported adjacent one end of the body, a keeper carried by one end of the coiled spring and coöperating with the treadle for holding the coiled spring in an expanded position, a catching element including a loop of wire having its ends connected adjacent one end of the coiled spring, said coiled spring adapted to draw the ends of the catching elements into the body of the trap, when the keeper has been actuated, and a flexible securing element having connection with the catching element.

3. A trap including a tubular body, a coiled spring within the tubular body, a catching element controlled by the coiled spring, means for holding the spring in an expanded position, when the trap is set, and means extending through the coiled spring and having connection with the catching element for preventing the release of an animal caught by the catching element.

In testimony that I claim the foregoing as my own, I have hereto affixed my signature in the presence of two witnesses.

FELIX H. CRAGO.

Witnesses:
 JAMES M. SELF,
 EDNA E. COULTER.